(12) United States Patent
Brocklesby et al.

(10) Patent No.: US 10,394,278 B1
(45) Date of Patent: Aug. 27, 2019

(54) INFORMATION HANDLING SYSTEM WITH THIN FLEX HINGE

(71) Applicant: DELL PRODUCTS, LP, Round Rock, TX (US)

(72) Inventors: Brandon J. Brocklesby, Pflugerville, TX (US); Jason S. Morrison, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/354,902

(22) Filed: Mar. 15, 2019

Related U.S. Application Data

(63) Continuation of application No. 15/978,629, filed on May 14, 2018, now Pat. No. 10,234,899.

(51) Int. Cl.
*G06F 1/16* (2006.01)
*H05K 5/00* (2006.01)
*H05K 7/00* (2006.01)

(52) U.S. Cl.
CPC .......... *G06F 1/1618* (2013.01); *G06F 1/1681* (2013.01); *G06F 1/1683* (2013.01)

(58) Field of Classification Search
CPC .... G06F 1/1618; G06F 1/1681; G06F 1/1683; G06F 1/1616; G06F 1/1641; G06F 1/1652; E05D 3/06; E05D 11/0054; E05D 5/08
USPC .............. 361/679.04, 679.26–679.3, 679.55, 361/679.56; 16/221, 277, 302, 366
See application file for complete search history.

(56) References Cited

U.S. PATENT DOCUMENTS

| | | | |
|---|---|---|---|
| 7,602,606 B2 | 10/2009 | Schlesener et al. | |
| 9,013,864 B2 * | 4/2015 | Griffin | H04M 1/0216 16/382 |
| 9,047,055 B2 * | 6/2015 | Song | E05D 3/14 |
| 9,176,535 B2 * | 11/2015 | Bohn | G06F 1/1641 |
| 9,348,370 B2 * | 5/2016 | Song | G06F 1/1681 |
| 9,477,269 B2 | 10/2016 | Morrison | |
| 9,603,271 B2 * | 3/2017 | Lee | H05K 5/0017 |
| 9,658,654 B1 | 5/2017 | Wu et al. | |
| 9,860,999 B1 * | 1/2018 | Hsu | E05D 3/06 |
| 9,930,794 B2 * | 3/2018 | Luan | H05K 5/0217 |
| 2012/0264489 A1 * | 10/2012 | Choi | H04M 1/0216 455/566 |
| 2013/0037228 A1 * | 2/2013 | Verschoor | G06F 1/1652 160/377 |
| 2014/0042293 A1 * | 2/2014 | Mok | G06F 1/1652 248/682 |
| 2016/0085271 A1 | 3/2016 | Morrison et al. | |
| 2016/0198579 A1 * | 7/2016 | Hong | F16M 13/00 248/346.01 |
| 2017/0023987 A1 * | 1/2017 | Wang | G06F 1/1681 |
| 2017/0094775 A1 * | 3/2017 | Fan | G06F 1/1652 |

\* cited by examiner

*Primary Examiner* — Anthony M Haughton
(74) *Attorney, Agent, or Firm* — Larson Newman, LLP

(57) ABSTRACT

An information handling system includes a flex hinge having a first flexible sheet that bends at a different radius than a second flexible sheet when the flex hinge is transitioned from a first position to a second position. A mounting bracket fixes each of the flexible sheets to the information handling system, and a friction linkage engages with slots within the first and second flexible sheets. An organic light emitting diode is connected to the flex hinge.

20 Claims, 6 Drawing Sheets

INFORMATION HANDLING SYSTEM WITH THIN FLEX HINGE

CROSS-REFERENCE TO RELATED APPLICATION

This application is a continuation of U.S. patent application Ser. No. 15/978,629 entitled "Information Handling System with Thin Flex Hinge," filed on May 14, 2018, now U.S. Pat. No. 10,234,899, the disclosure of which is hereby expressly incorporated by reference in its entirety.

FIELD OF THE DISCLOSURE

The present disclosure generally relates to information handling systems, and more particularly relates to an information handling system with a thin flex hinge.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may include a flex hinge having a first flexible sheet that bends at a different radius than a second flexible sheet when the flex hinge is transitioned from a first position to a second position. A mounting bracket fixes each of the flexible sheets to the information handling system, and a friction linkage engages with slots within the first and second flexible sheets. An organic light emitting diode is connected to the flex hinge.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
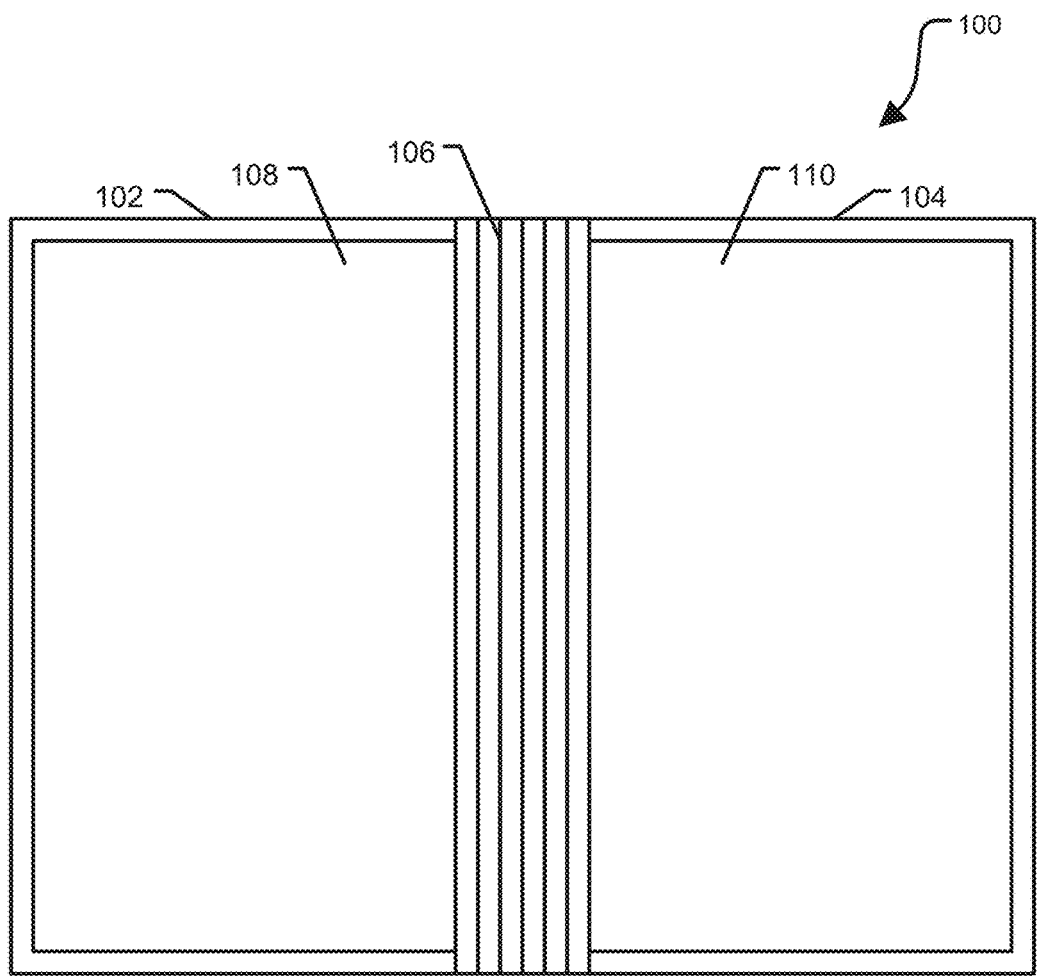
FIG. 1 is a diagram of an information handling system with a flex hinge assembly according to at least one embodiment of the disclosure.

FIG. 1 shows an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

The information handling system 100 includes display portions 102 and 104, and a flex hinge assembly 106. In an embodiment, the display portion 102 can include a display 108 and the display portion 104 can include a display 110. The flex hinge assembly 106 can connect the display portions 102 and 104 together. The flex hinge assembly 106 can operate as a single piece of material being flexed or folded while the information handling system 100 transitions from a first position to a second position. In an embodiment, the first and second positions can be a closed position and an open position.

In an embodiment, the flex hinge assembly 106 can include multiple layers of thin flex sheets contacting an adjustable friction linkage to support the information handling system 100 to rotate from zero to three hundred and sixty degrees. In an embodiment, the flex hinge assembly can support an information handling system 100 with around an eight mm thickness. While the information handling system 100 is shown with two displays 108 and 110, the flex hinge assembly 106 can support the information handling system 100 with a single flexible organic light emitting diode (OLED) display that extends across both portions 102 and 104.

Figure 2:
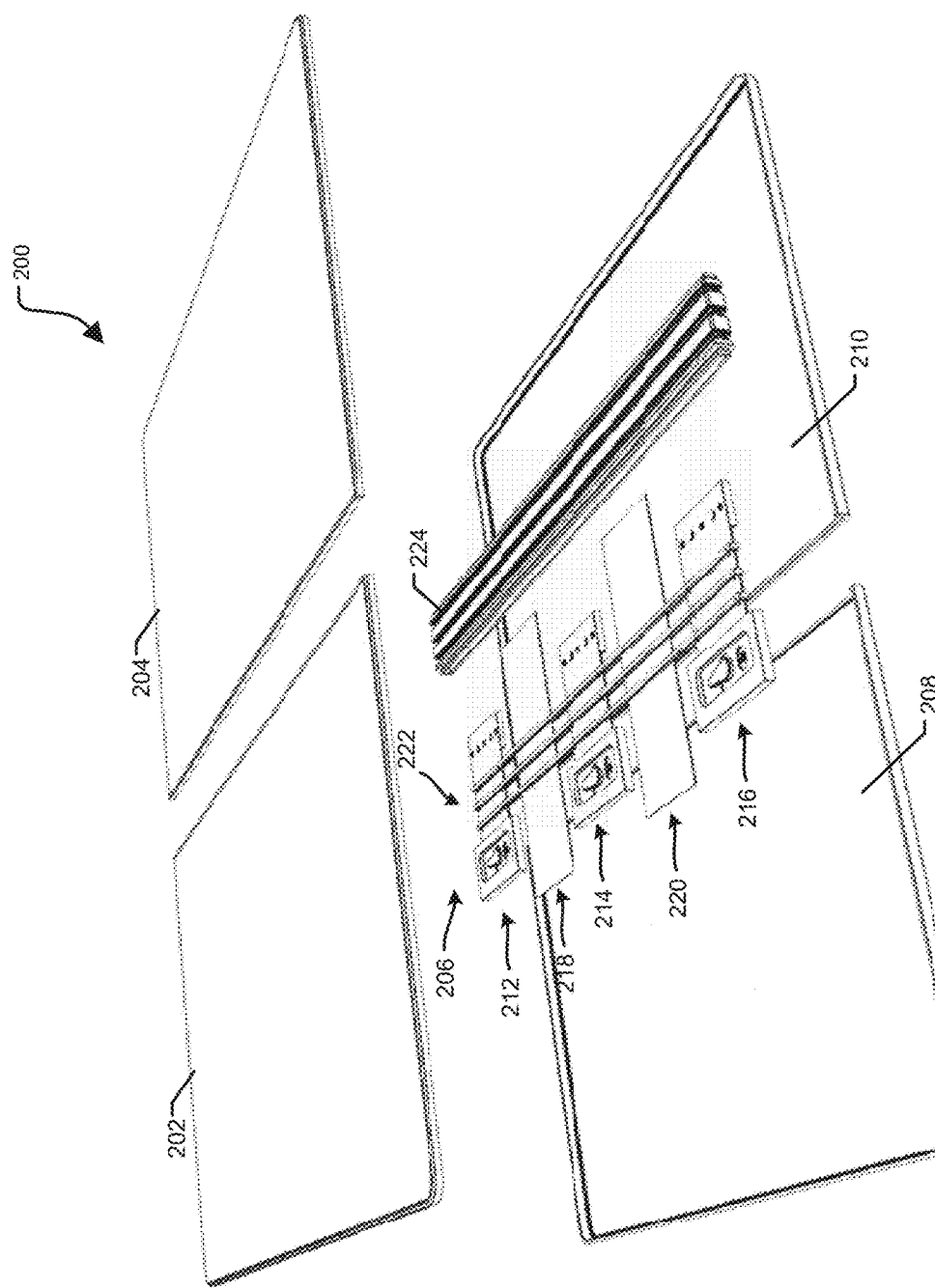
FIG. 2 is an exploded view of the information handling system and flex hinge assembly according to at least one embodiment of the disclosure.

FIG. 2 shows an exploded view of an information handling system 200 according to at least one embodiment of the disclosure. The information handling system 200 includes display portions 202 and 204, a flex hinge assembly 206, and back panels 208 and 210. The flex hinge assembly 206 includes flex hinges 212, 214, and 216, flat cable bundles 218 and 220, support bars 222, and a shroud 224. The flex hinges 212, 214, and 216 can be fixed to the back panel 210 and adjustably connected to the back panel 208. For example, the flex hinges 212, 214, and 216 can be mounted to the back panel 210 in a manner such that no component of the flex hinges 212, 214, and 216 moves in relation to the back panel 210. The flex hinges 212, 214, and 216 can be adjustably mounted to the back panel 208 in a manner such that one or more components of the flex hinges 212, 214, and 216 move in relation to the back panel 208.

In an embodiment, the flex hinges 212, 214, and 216 can provide a desired bending torque for the information handling system 200. The flat cable bundles 218 and 220 can provide electrical communication between the display portions 202 and 204, and can fit between the support bars 222 of the flex hinge assembly 206. The support bars 222 can span between the flex hinges 212, 214, and 216 and the flat bundle wires 218 and 220 to synchronize the movements of the flex hinges 212, 214, and 216, to protect the flat bundle wires 218 and 220, and to provide a structural support to the shroud 224. The details of the flex hinges 212, 214, and 216 will be discussed in greater detail below with respect to FIGS. 3-7.

Figure 3:
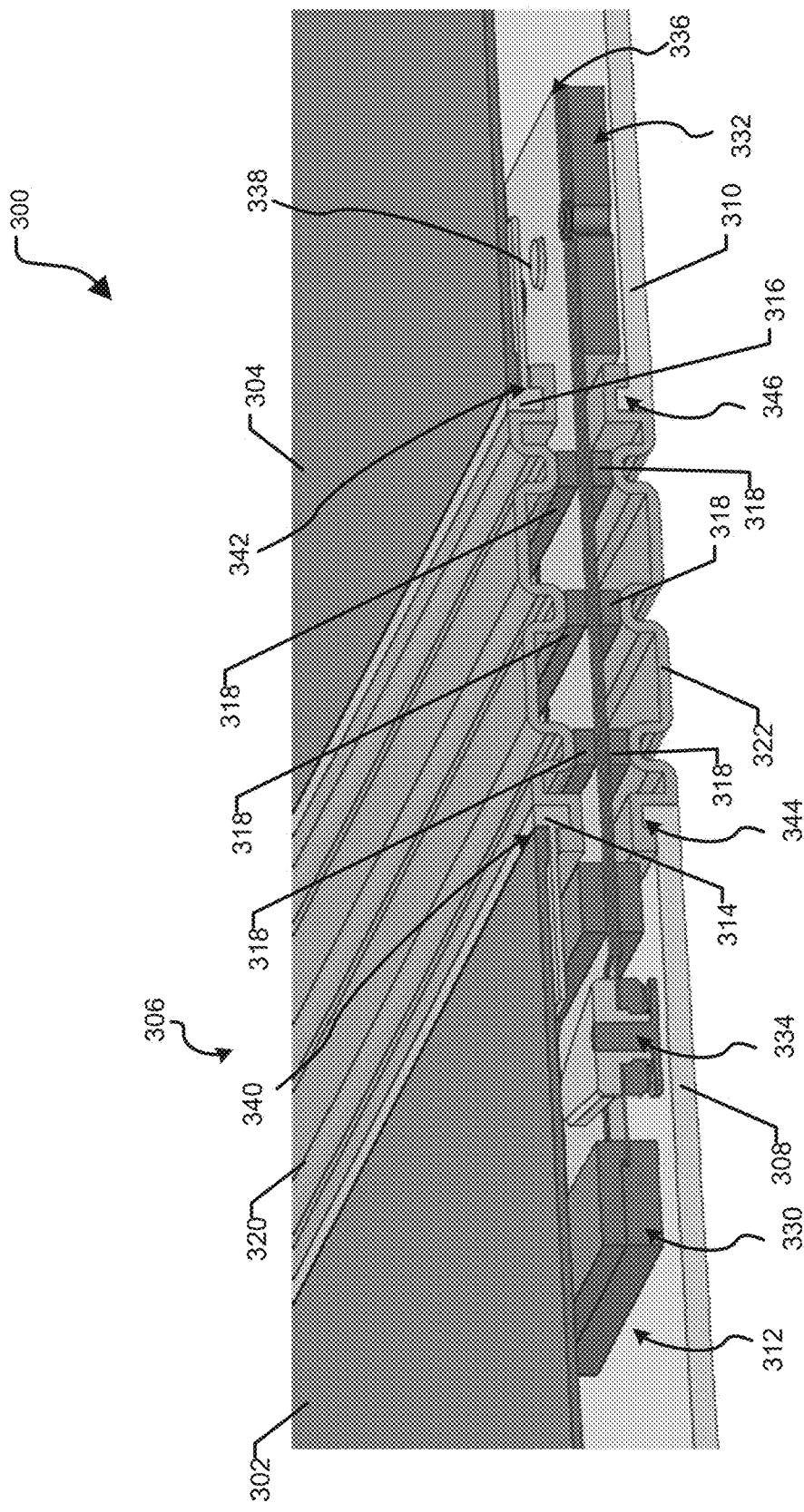
FIG. 3 is a cross-sectional view of the information handling system and flex hinge assembly according to at least one embodiment of the present disclosure.

FIG. 3 shows a cross sectional view of a portion of an information handling system 300 according to at least one embodiment of the present disclosure. The information handling system 300 includes display portions 302 and 304, a shroud 306, back panels 308 and 310, a flex hinge 312, attachments 314 and 316, and support bars 318. The shroud 306 includes a top portion 320 and a bottom portion 322. The flex hinge 312 includes mounting brackets 330 and 332, a friction linkage 334, multiple flex sheets 336, and a pin 338.

The attachment 314 can be connected to the display portion 302 and can provide an interlocking connection with the top portion 320 of the shroud 306 at point 340. The attachment 316 can be connected to the display portion 304 and can provide an interlocking connection with the top portion 320 of the shroud 306 at point 342. Thus, the attachment portions 314 and 316 can securely connect the top portion 320 of the shroud 306 to the display portions 302 and 304. The bottom portion 322 of the shroud 306 can interlock with the back panel 308 at point 344, and can interlock with the back panel 310 at point 346. The top 320 and bottom 322 of the shroud 306 can be flexible and bend as the information handling system 300 is folded and unfolded during use. Thus, the shroud 306 can provide a flexible cover for the flex hinge 312.

The mounting bracket 330 and the friction linkage 334 can couple the flexible sheets 336 to the back panel 308. In an embodiment, a middle sheet, or neutral sheet, of the flexible sheets 336 can be securely held within the mounting bracket 330 and can be in tight physical communication with the friction bracket 334. However, the other flexible sheets can be held within the mounting bracket 330 and within the friction linkage 334 in such a manner as to allow the other flexible sheets to move in relation to the neutral sheet and the back panel 308 while the information handling system 300 is folded and unfolded during use. The flexible sheets 336 of the flex hinge 312 can be fixed to the back panel 310 of the information handling system 300 via the mounting bracket 332 and the pin 338. In an embodiment, the pin 338 can secure the flexible sheets 336 to the mounting bracket 332, such that the flexible sheets 336 do not move in relation to the back panel 310 when the information handling system 300 is folded and unfolded during use.

Figure 4:
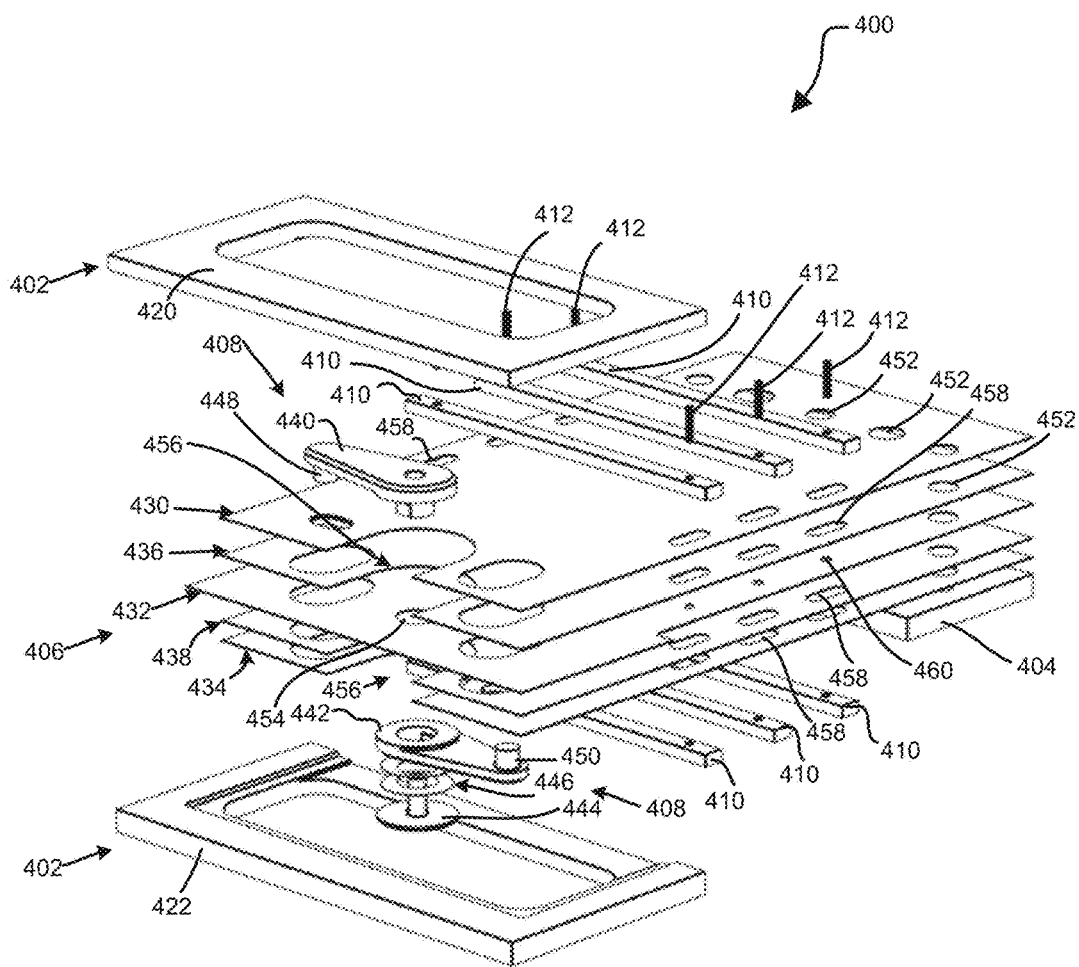
FIG. 4 is an exploded view of a flex hinge of the flex hinge assembly according to at least one embodiment of the present disclosure.

FIG. 4 shows an exploded view of a flex hinge 400, such as one of the flex hinges 212, 214, and 216 of the flex hinge assembly 206 in FIG. 2, according to at least one embodiment of the present disclosure. The flex hinge 400 includes mounting brackets 402 and 404, flexible sheets 406, friction linkage 408, support bars 410, and pins 412. The mounting bracket 402 includes a top 420 and a bottom 422. The flexible sheets 406 include a top sheet 430, a neutral sheet 432, a bottom sheet 434, and spacer sheets 436 and 438. In an embodiment, the top sheet 430, the neutral sheet 432, and the bottom sheet 434 can be any type of metal, such as titanium, which in turn can be substantially thin to enable the sheets to be flexible. In an embodiment, the spacer sheets 436 and 438 can be any type of material to allow the metal sheet to slide along the space sheets 436 and 438, such as Teflon. The friction linkage 408 includes a top clamp 440, a bottom clamp 442, a pin 444, and dome washers 446. In an embodiment, the pin 444 can be a press-fit nail head pin, such that the pin 444 includes a head the size of the dome washers 446. The top clamp 440 includes an insert pin 448, and the bottom clamp 442 includes an insert pin 450.

Figure 7:
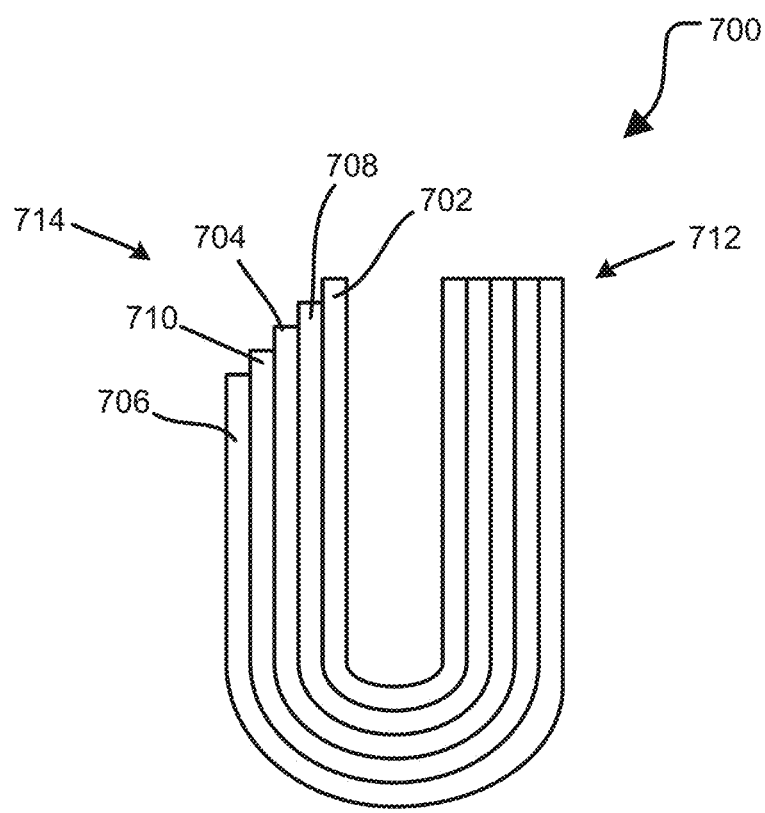
FIG. 7 is a diagram showing relative movement of the flex sheets of the flex hinge according to at least one embodiment of the present disclosure.

Each of the flexible sheets 430, 432, and 434 and the spacer sheets 436 and 438 include holes 452 along one edge, such that each of the flexible sheets 406 can be securely connected to the mounting bracket 404 via one or more pins, such as pin 338 of FIG. 3. The flexible sheets 406 also include holes and/or notches to interface with the friction linkage 408 and with the support bars 410. For example, the neutral sheet 432 includes a hole 454 that a portion of the top clamp 440 is inserted through to enable the top clamp to slide through the bottom clamp 442 and to connect with the pin 444. The top sheet 430, the bottom sheet 434, and the spacer sheets 436 and 438 each include a notch 456 to enable the top sheet 430, the bottom sheet 434, and the spacer sheets 436 and 438 to move in relation to the neutral sheet 432 and the friction linkage 408. The top sheet 430, the bottom sheet 434, and the spacer sheets 436 and 438 can each include multiple elongated holes 458 to enable the pins 412 to pass through the top sheet 430, the bottom sheet 434, and the spacer sheets 436 and 438 and extend from one support bar 410 on top of the top sheet 430 to a support bar 410 on the bottom of bottom sheet 434. The neutral sheet 432 can include multiple holes 460 to enable the pins 412 to pass through the top sheet 432. Alternately, a boss can be connected to the first and second support bars to cause the first and second support bars to clamp the flexible sheets together to prevent separation during flexing When the flex hinge 400 is connected together, the neutral sheet 432 is clamped between the top 420 and the bottom 422 of the mounting bracket 402, such that the neutral sheet 432 cannot move in relation to the mounting bracket 402 while the information handling system 300 is folded and unfolded during use. In an embodiment, the top clamp 440 of the friction linkage 406 is placed in physical communication with the top sheet 430 and with the neutral sheet 432. In an embodiment, the bottom clamp 442 of the friction linkage 406 is placed in physical communication with the bottom sheet 434 and with the neutral sheet 432. During operation of the flex hinge 400, such as when the flex hinge 400 moved from one position to another, the top sheet 430 can have a smaller bend radius than the neutral sheet 432 and the bottom sheet 434 can have a larger bend radius than the neutral sheet 432 as shown in FIG. 7 below. Thus, the top arm 440 and the bottom arm 442 of the friction linkage 406 rotate to enable the flex hinge 400 to flex during use. In an embodiment, the holes 458 within the top sheet 430, the bottom sheet 434, and the spacer sheets 436 and 438 are larger than the holes 460 within the neutral sheet 432 to enable the pins 412 to move within the holes 458 in response to the top sheet 430, the bottom sheet 434, and the spacer sheets 436 and 438 moving in relation to the neutral sheet 432 while the flex hinge 406 is moved.

The dome washers 446 generate friction between the linkage element 408 and the neutral sheet 432. In an embodiment, the friction can be overcome when a user exerts a force on the flex hinge 400 that is greater than the force created by the dome washers 446. In an embodiment, the friction force generated by the dome washers 446 can be sufficiently large to prevent rotation of the flex hinge 400 when only a bending stress of the flex sheets 406 is acting upon the friction linkage 406. Thus, in this embodiment, once the flex hinge 400 is flexed to a particular position, the flex hinge 400 can remain in that position until a user forces the flex hinge to another position.

Figure 5:
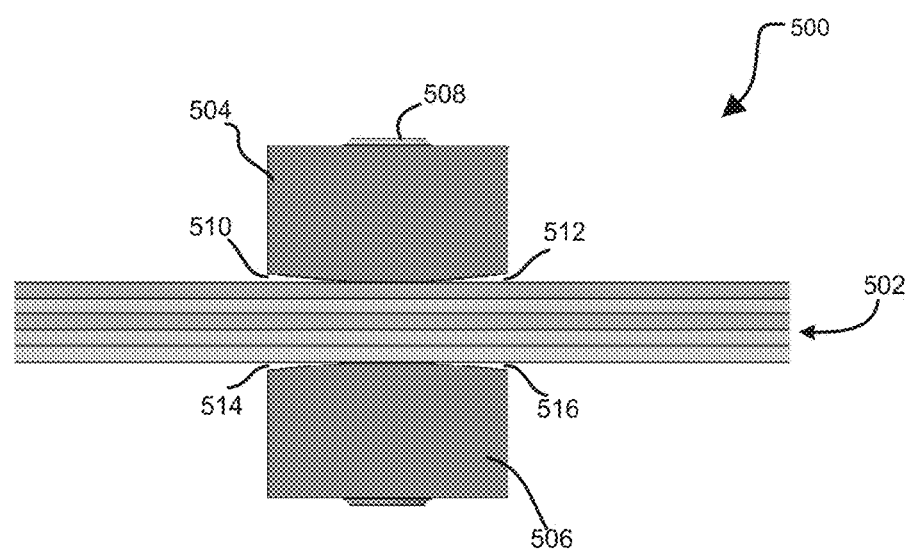
FIG. 5 is a side view of support bars and flex sheets of a flex hinge according to at least one embodiment of the present disclosure.

FIG. 5 shows a portion of a flex hinge 500 including flex sheets 502, support bars 504 and 506, and a pin 508 according to at least one embodiment of the present disclosure. In an embodiment, the pin 508 clamps the support bars 504 and 506 to the flex sheets 502 to prevent the flex sheets from separating during flexing of the flex hinge 500. In an embodiment, a length of the pin 508 can be selected to keep the support bats 504 and 506 in physical communication with the flex sheets 502 but not to provide any additional pressure on the flex sheets 502 that may prevent the movement of the flex sheets 502.

An edge of the support bar 504 in physical communication with a top sheet of the flex sheets 502 can be curved to provide spaces 510 and 512 between the support bar 504 and the top sheet of the flex sheets 502. Similarly, an edge of the support bar 506 in physical communication with a bottom sheet of the flex sheets 502 can be curved to provide spaces 514 and 516 between the support bar 506 and the bottom sheet of the flex sheets 502. In an embodiment, the spaces 510, 512, 514, and 516 can allow the flex sheets 502 to flex without inducing additional stresses from the support bars 504 and 506.

Figure 6:
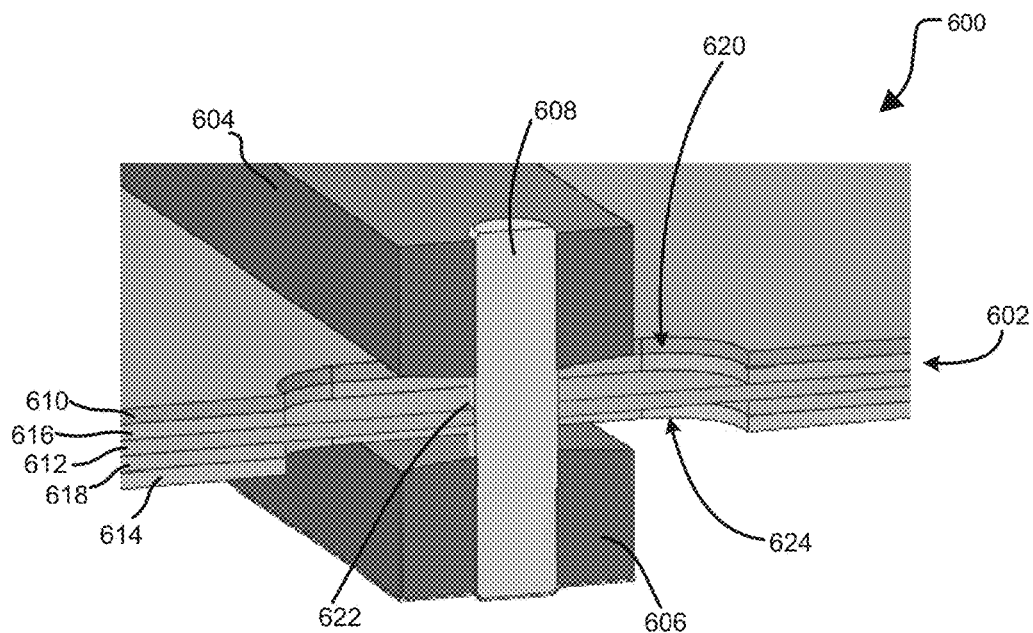
FIG. 6 is a cross-sectional view of the support bars and the flex sheets of a flex hinge according to at least one embodiment of the present disclosure.

FIG. 6 shows a portion of a flex hinge 600 including flex sheets 602, support bars 604 and 606, and a pin 608 according to at least one embodiment of the present disclosure. The flex sheets 602 include a top sheet 610, a neutral sheet 612, a bottom sheet 614, and spacer sheets 616 and 618. In an embodiment, the top sheet 610 and the spacer sheet 616 can each include a hole 620. The neutral sheet can include a hole 622, and the bottom sheet 614 and the spacer sheet 618 can each include a hole 624. In an embodiment, the holes 620 and 624 can be elongated holes, such as holes 458 of FIG. 4. In an embodiment, the hole 622 can be substantially the same size as the diameter of the pin 608, such as holes 460 of FIG. 4. In an embodiment, the holes 620 and 624 can enable the top sheet 610, the bottom sheet 614, and the spacer sheets 616 and 618 to slide relative to the neutral sheet 612 while the flex hinge 600 is moved.

FIG. 7 shows flex sheets 700 of the flex hinge, such as flex hinge 400 in FIG. 4, according to at least one embodiment of the present disclosure. The flex sheets 700 include a top sheet 702, a neutral sheet 704, a bottom sheet 706, and spacer sheets 708 and 710. In an embodiment, the flex sheets 700 are part of a flex hinge and are preferably in physical communication with other components of a flex hinge, such as the components described in FIG. 4 above. However, for simplicity and clarity only the flex sheets 700 are shown and described in FIG. 7.

In an embodiment, the flex sheets 700 are in a closed position, such that an information handling system associated with the flex hinge and flex sheets 700 is closed. In this position, the neutral sheet 704 bends to provide a relative bend radius for the other flex sheets based on the neutral sheet 704 being connected to both the sides of an information handling system as described above with respect to FIGS. 2-4. In an embodiment, one edge 712 of each of the top sheet 702, the neutral sheet 704, the bottom sheet 706, and the spacer sheets 708 and 710 is held together, such that is there is no relative motion between the flex sheets 700 at the edge 712.

In an embodiment, an edge 714 of each of the top sheet 702, the neutral sheet 704, the bottom sheet 706, and the spacer sheets 708 and 710 is moveably held together, such as by the friction linkage 408 of FIG. 4. Thus, the top sheet 702, the bottom sheet 706, and the spacer sheets 708 and 710 experience movement relative to the neutral sheet along edge 714 when the flex hinge is moved. For example, the top sheet 702 and spacer sheet 708 in the up direction relative to the neutral sheet 704, the bottom sheet 706 and spacer 710 move in the down direction relative to the neutral sheet 704. In an embodiment, the relative movement of the top sheet 702, the bottom sheet 706, and the spacer sheets 708 and 710 with respect to the neutral sheet 704 can enable the flex hinge to smoothly flex without exerting a large amount of force on the flex sheets 700 when an information handling system is opened and closed.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
 a flex hinge including:
  a first flexible sheet that bends at a different radius than a second flexible sheet when the flex hinge is transitioned from a first position to a second position;
  a flexible neutral sheet located between the first and second flexible sheets;
  a first mounting bracket fixing each of the flexible sheets to a first portion of the information handling system;
  a friction linkage engaged with slots within the first and second flexible sheets; and
  a second mounting bracket coupling the flexible neutral sheet to a second portion of the information handling system; and
 an organic light emitting diode connected to the flex hinge.

2. The information handling system of claim 1, further comprising a first support bar in physical communication with the first flexible sheet, and a second support bar in physical communication with the second flexible sheet, wherein a surface of the first support bar is curved.

3. The information handling system of claim 2, further comprising a shroud in physical communication with the first and second support bars, the shroud connected between the first and second portions of the information handling system to cover the flex hinge.

4. The information handling system of claim 1, wherein the friction linkage includes a first linkage arm in physical communication with the first flexible sheet and with the flexible neutral sheet, and a second linkage arm in physical communication with the second flexible sheet and with the flexible neutral sheet.

5. The information handling system of claim 4, wherein compression between the first and second linkage arms and the flexible neutral sheet provides a friction force greater than a force from a bending of the first and second flexible sheets.

6. The information handling system of claim 5, wherein the friction force holds the flex hinge in a flexed shape.

7. The information handling system of claim 6, further comprising the flex hinge to flex and to unflex in response to a force being exerted that is greater than the friction force of the first and second linkage arms.

8. An information handling system, comprising:
 a first display portion and a second display portion;
 an organic light emitting diode that extends across the first display portion and the second display portion; and
 a flex hinge including:
  a first flexible sheet slidable a different amount than a neutral flexible sheet when the flex hinge is transitioned from a first position to a second position;
  a first mounting bracket fixing each of the flexible sheets to the information handling system;
  a friction linkage engaged with slots within the first flexible sheet to movably couple the first flexible sheet to the information handling system; and
  a second mounting bracket coupling the neutral flexible sheet to the information handling system.

9. The information handling system of claim 8, further comprising a first support bar in physical communication with the first flexible sheet, and a second support bar in physical communication with the second flexible sheet, wherein a surface of the first support bar is curved.

10. The information handling system of claim 9, further comprising a shroud in physical communication with the support bars, the shroud connected between the first and second display portions to cover the flex hinge.

11. The information handling system of claim 8, wherein the friction linkage includes a first linkage arm in physical communication with the first flexible sheet.

12. The information handling system of claim 11, wherein the friction linkage further includes a second linkage arm, wherein the first and second linkage arms provide a friction force greater than a force from bending the flexible sheets.

13. The information handling system of claim 12, wherein the friction force holds the flex hinge in the first position.

14. An information handling system comprising:
 a first display portion;
 a flex hinge including:
  first and second flexible sheets, the first flexible sheet to slide a different amount than the second flexible sheet when the first flex hinge transitions;
  a first mounting bracket to fix the first and second flexible sheets to the information handling system;
  a neutral sheet located between and in physical communication with the first and second flexible sheets;
  a friction linkage engaged with slots within each of the first and second flexible sheets; and
  a second mounting bracket coupling the neutral sheet to the information handling system;
 a second display portion separated from the first display portion by the flex hinge; and
 an organic light emitting diode connected to the first display portion and connected to the second display portion.

15. The information handling system of claim 14, further comprising a first support bar in physical communication with the first flexible sheet.

16. The information handling system of claim 15, further comprising a second support bar in physical communication with the second flexible sheet.

17. The information handling system of claim 16, wherein a surface of the first support bar in communication with the first flexible sheet is curved.

18. The information handling system of claim 17, wherein a surface of the second support bar in communication with the second flexible sheet is curved.

19. The information handling system of claim 18, further comprising a shroud in physical communication with support bars.

20. The information handling system of claim 15, wherein the friction linkage includes a first linkage arm and a second linkage arm, wherein compression between the first and second linkage arms provides a friction force greater than a force from a bending of the flexible sheets.

\* \* \* \* \*